(12) United States Patent
Park et al.

(10) Patent No.: US 7,061,554 B2
(45) Date of Patent: Jun. 13, 2006

(54) LIQUID CRYSTAL DISPLAY

(75) Inventors: Jeong Ki Park, Kumi-shi (KR); Jae Seok Park, Taegu-Kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/146,116

(22) Filed: Jun. 7, 2005

(65) Prior Publication Data

US 2005/0225689 A1 Oct. 13, 2005

Related U.S. Application Data

(62) Division of application No. 10/878,024, filed on Jun. 29, 2004, now Pat. No. 6,924,853, which is a division of application No. 09/828,839, filed on Apr. 10, 2001, now Pat. No. 6,839,097.

(30) Foreign Application Priority Data

Apr. 12, 2000 (KR) ............... 2000-19354

(51) Int. Cl.
*G02F 1/1333* (2006.01)

(52) U.S. Cl. ...................... 349/40

(58) Field of Classification Search ............ 349/40
See application file for complete search history.

(56) References Cited

U.S. PATENT DOCUMENTS

| | | | | |
|---|---|---|---|---|
| 5,220,443 A | * | 6/1993 | Noguchi ............ | 349/40 |
| 5,371,351 A | * | 12/1994 | Van Berkel ........ | 250/208.1 |
| 5,497,146 A | * | 3/1996 | Hebiguchi ......... | 340/14.63 |
| 5,657,139 A | | 8/1997 | Hayashi | |
| 5,744,837 A | | 4/1998 | Kamiura et al. | |
| 5,936,687 A | | 8/1999 | Lee | |
| 5,953,086 A | | 9/1999 | Oogiichi et al. | |
| 5,973,658 A | | 10/1999 | Kim et al. | |
| 6,043,971 A | | 3/2000 | Song et al. | |
| 6,072,550 A | * | 6/2000 | Kim .................. | 349/40 |
| 6,175,394 B1 | * | 1/2001 | Wu et al. .......... | 349/40 |
| 6,304,305 B1 | | 10/2001 | Matsumoto et al. | |
| 6,340,963 B1 | * | 1/2002 | Anno et al. ........ | 345/92 |
| 6,587,160 B1 | * | 7/2003 | Lee et al. .......... | 349/40 |

FOREIGN PATENT DOCUMENTS

| | | |
|---|---|---|
| DE | 196 13 477 A1 | 10/1997 |
| JP | 9090428 | 4/1997 |
| JP | 9297321 | 11/1997 |
| JP | 10010493 | 1/1998 |
| JP | 11-119256 A | 4/1999 |

* cited by examiner

*Primary Examiner*—Toan Ton
(74) *Attorney, Agent, or Firm*—McKenna Long & Aldridge LLP

(57) ABSTRACT

An LCD provided with an electrostatic protecting circuit includes a plurality of signal lines formed at constant intervals, a common electrode arranged in a vertical direction to the signal lines, a plurality of first electrostatic protecting circuits respectively arranged at one side of the common electrode between adjacent first and second signal lines in pairs to be connected with the first signal lines of the respective pairs and the common electrode, and a plurality of second electrostatic protecting circuits arranged a the other side of the common electrode to be connected with the second signal lines of the respective pairs and the common electrode. Thus, a narrow space of the signal lines can efficiently be used and the LCD of high resolution can be obtained.

6 Claims, 6 Drawing Sheets

US 7,061,554 B2

LIQUID CRYSTAL DISPLAY

CROSS-REFERENCE TO RELATED APPLICATIONS

This application is a Divisional of application Ser. No. 10/878,024, filed Jun. 29, 2004 now U.S. Pat. No. 6,924,853; which is a divisional of prior application Ser. No. 09/828,839, filed Apr. 10, 2001, now U.S. Pat. No. 6,839,097, which claims priority to Korean Patent Application No. 2000-19354, filed Apr. 12, 2000, all of which are hereby incorporated by reference as if fully set forth herein.

BACKGROUND OF THE INVENTION

1. Field of the Invention

The present invention relates to a liquid crystal display (LCD), and more particularly, to an LCD in which an electrostatic protecting circuit is arranged using a narrow signal line interval.

2. Discussion of the Related Art

Generally, an LCD includes a liquid crystal panel, a light source, and a driving circuit.

The liquid crystal panel includes upper and lower transparent substrates, and a liquid crystal layer in which a liquid crystal is injected between the upper and lower transparent substrates.

A common electrode, a black matrix layer, and a color filter layer are formed on the upper transparent substrate. A plurality of gate lines are arranged on the lower transparent substrate in one direction at constant intervals. A plurality of data lines are arranged at constant intervals in a vertical direction to the gate lines, so that an LCD array is formed in crossing points of the gate lines and the data lines. In the LCD array, a pixel region is formed in a space between the respective gate and data lines. A pixel electrode and a thin film transistor are arranged in each pixel region. A gate electrode is connected to the gate lines, a source electrode is connected to the data lines, and a pixel electrode is connected to a drain electrode, so that the thin film transistor is selectively turned on in accordance with a signal applied to the gate lines. Thus, a data signal of the data lines is applied to the pixel electrode. The respective gate and data lines are electrically connected to a driving circuit.

In the aforementioned LCD, since static electricity occurs during process steps or test, it is likely that devices of the LCD array are destroyed and damaged if the static electricity is applied to the gate lines or the data lines.

To protect the LCD array from the static electricity, the common electrode is formed between the driving circuit and the LCD array in a vertical direction to the gate and data lines, and an electrostatic protecting circuit is formed in either a crossing portion of the data lines and the common electrode or a crossing portion of the gate lines and the common electrode.

If the electrostatic protecting circuit is formed as above, equivalent potential to the common electrode is formed in the gate lines and the data lines by the electrostatic protecting circuit. Accordingly, even if the static electricity is applied to the gate lines or the data lines, it does not affect the devices of the LCD array.

A related art LCD provided with the aforementioned electrostatic protecting circuit will be described with reference to the accompanying drawings.

FIG. 1 is a schematic view of a related LCD provided with an electrostatic protecting circuit.

In the related art LCD, since a pixel size is greater than the electrostatic protecting circuit, the electrostatic protecting circuit is arranged in parallel.

As shown in FIG. 1, in a state that a common electrode 4 is arranged between a driving circuit 1 and an LCD array 2 in a vertical direction to data lines 3 or gate lines, an electrostatic protecting circuit 5 is arranged in one direction to correspond to portions, one to one, between the respective data lines 3 in crossing portions of the common electrode 4 and the data lines 3.

The respective data line 3 or the respective gate line is formed in a straight line between the driving circuit 1 and the LCD array 2.

However, the related art LCD provided with the electrostatic protecting circuit has several problems.

Since the electrostatic protecting circuit is arranged between the respective data lines in the crossing portion of the data line and the common electrode, it is difficult to arrange the electrostatic protecting circuit if the pixel size is smaller than the electrostatic protecting circuit.

In other words, since a space is narrow between the data lines in the LCD of high resolution, it is difficult to arrange the electrostatic protecting circuit therein. The LCD of high resolution cannot be obtained due to the electrostatic protecting circuit.

SUMMARY OF THE INVENTION

Accordingly, the present invention is directed to an LCD that substantially obviates one or more of the problems due to limitations and disadvantages of the related art.

An object of the present invention is to provide an LCD in which the position of an electrostatic protecting circuit is changed or signal lines (data lines or gate lines) have modified shapes to obtain high resolution.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, an LCD according to the present invention includes a plurality of signal lines formed at constant intervals, a common electrode arranged in a vertical direction to the signal lines, a plurality of first electrostatic protecting circuits respectively arranged at one side of the common electrode between adjacent first and second signal lines in pairs to be connected with the first signal lines of the respective pairs and the common electrode, and a plurality of second electrostatic protecting circuits arranged at the other side of the common electrode to be connected with the second signal lines of the respective pairs and the common electrode.

To further achieve these and other advantages and in accordance with the purpose of the present invention, an LCD according to the present invention includes a plurality of signal lines formed at constant intervals, first and second common electrodes arranged at constant intervals in a vertical direction to the signal lines, a plurality of first and second electrostatic protecting circuits arranged at both sides of the first common electrode between first and second signal lines of odd numbered pairs in adjacent first and second signal lines in pairs to be respectively connected with a pair of the first signal line and the first common electrode and a pair of the second signal line and the first common electrode, and a plurality of third and fourth electrostatic protecting circuits arranged at both sides of the second common electrode between the first and second signal lines of even numbered pairs to be respectively connected with a pair of the first signal line and the second common electrode and a pair of the second signal line and the second common electrode.

To further achieve these and other advantages and in accordance with the purpose of the present invention, an LCD according to the present invention includes a plurality of signal lines formed at constant intervals, a common electrode arranged in a vertical direction to the signal lines, a plurality of first electrostatic protecting circuits connected with odd numbered signal lines and the common electrode at one side of the common electrode, and a plurality of second electrostatic protecting circuits connected with even numbered signal lines and the common electrode at the other side of the common electrode, wherein the respective signal lines adjacent to the first and second electrostatic protecting circuits are curved.

It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Reference will now be made in detail to the preferred embodiments of the present invention, examples of which are illustrated in the accompanying drawings.

Figure 1:
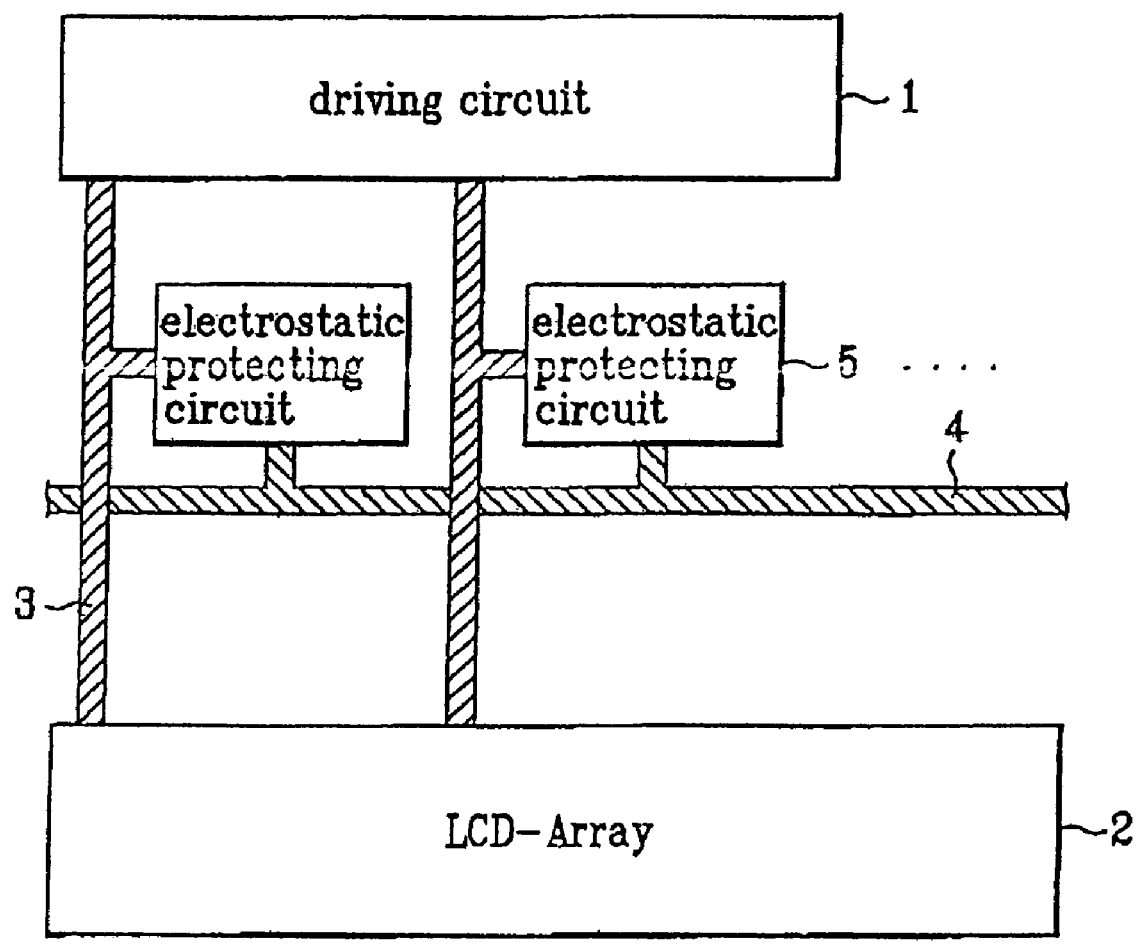
FIG. 1 is a schematic view of a related art LCD provided with an electrostatic protecting circuit.
Figure 2:
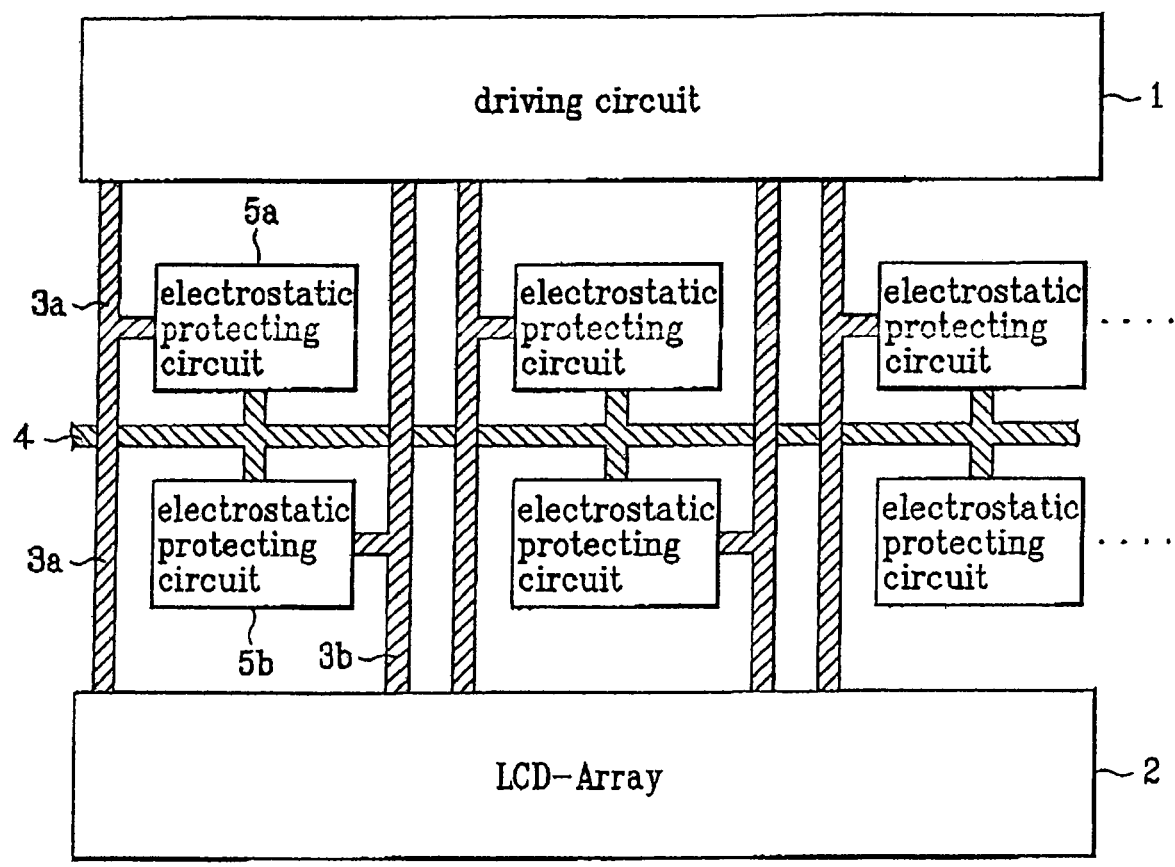
FIG. 2 is a schematic view of an LCD provided with an electrostatic protecting circuit according to the first embodiment of the present invention.

FIG. 2 is a schematic view of an LCD provided with an electrostatic protecting circuit according to the first embodiment of the present invention.

As shown in FIG. 2, in a state that a common electrode 4 is formed in a vertical direction to respective signal lines 3a and 3b (data lines or gate lines) between a driving circuit 1 and an LCD array 2, adjacent signal lines 3a and 3b are arranged in pairs and electrostatic protecting circuits 5a and 5b are arranged at both sides of the common electrode 4 between the respective signal lines 3a and 3b. The first electrostatic protecting circuit 5a is connected with the first signal lines 3a of the respective pairs and the common electrode 4 while the second electrostatic protecting circuit 5b is connected with the second signal lines 3b of the respective pairs and the common electrode 4. At this time, the respective signal lines 3a and 3b are not curved.

The LCD constructed as above can reduce a space between the whole signal lines.

Figure 3:
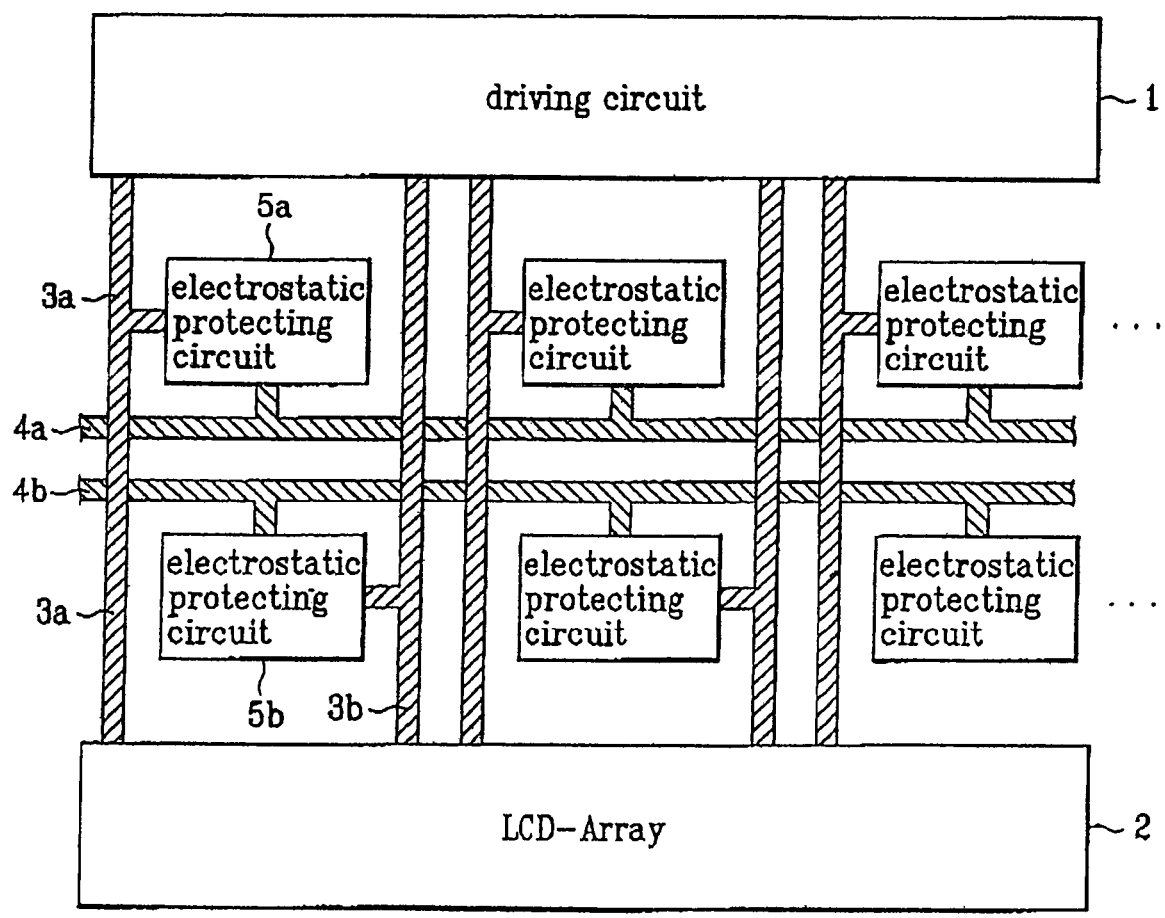
FIG. 3 is a schematic view of an LCD provided with an electrostatic protecting circuit according to the second embodiment of the present invention.

Meanwhile, FIG. 3 is a schematic view of an LCD provided with an electrostatic protecting circuit according to the second embodiment of the present invention.

In the LCD according to the second embodiment of the present invention, first and second common electrodes 4a and 4b are arranged. A first electrostatic protecting circuit 5a is connected between an odd numbered signal line 3a and the first common electrode 4a while a second electrostatic protecting circuit 5b is connected between an even numbered signal line 3b and the second common electrode 4b.

At this time, the electrostatic protecting circuits 5a and 5b are formed at both sides around the first and second common electrodes 4a and 4b. That is, the first electrostatic protecting circuit 5a is connected with the first signal line 3a and the first common electrode 4a while the second electrostatic protecting circuit 5b is connected with the second signal line 3b and the second common electrode 4b in a direction opposite to the first common electrode 4a.

Figure 4:
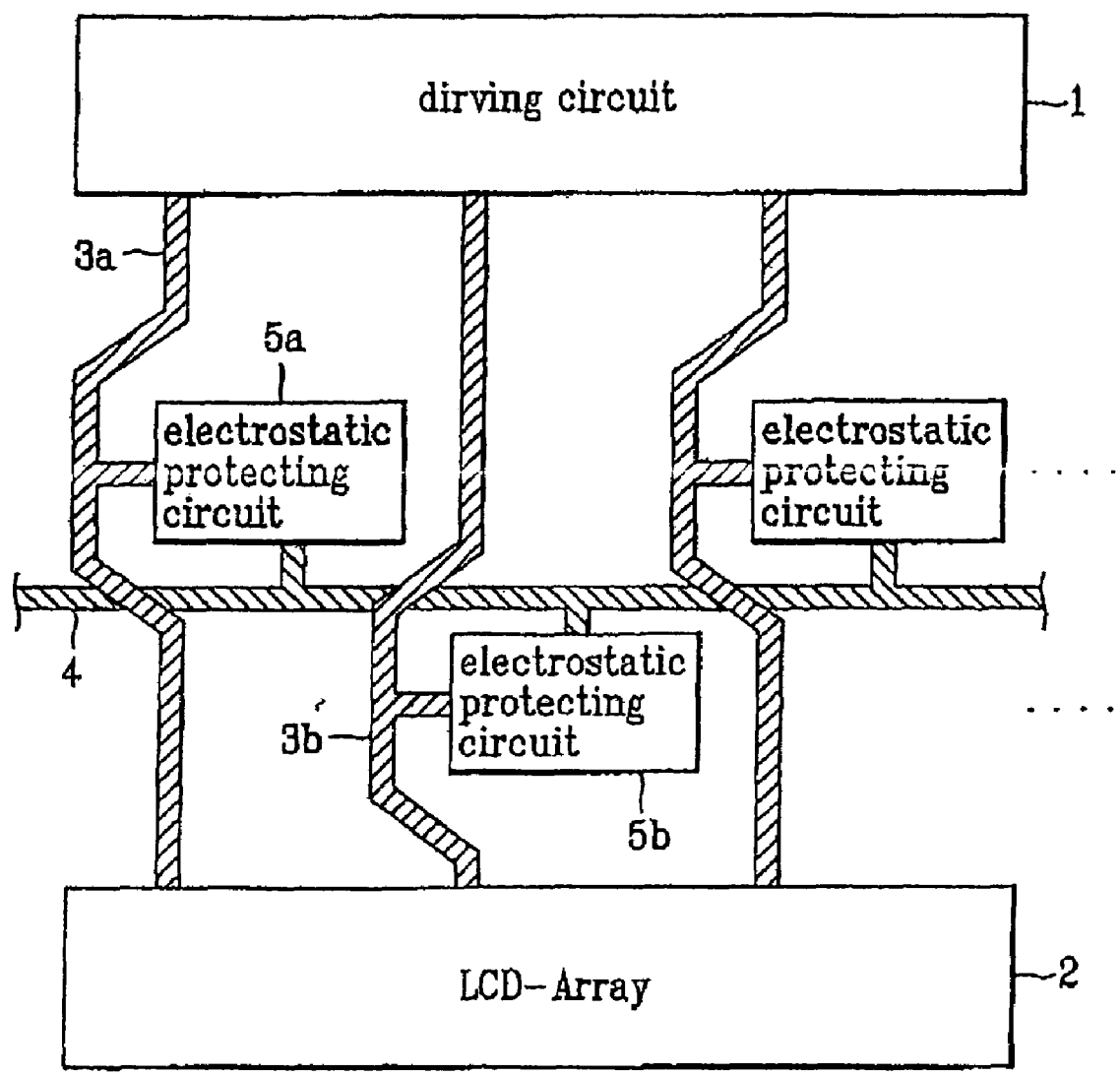
FIG. 4 is a schematic view of an LCD provided with an electrostatic protecting circuit according to the third embodiment of the present invention.

FIG. 4 is a schematic view of an LCD provided with an electrostatic protecting circuit according to the third embodiment of the present invention.

In the LCD according to the third embodiment of the present invention, a common electrode 4 is formed between a driving circuit 1 and an LCD array 2 in a vertical direction to a plurality of signal lines 3 (data lines or gate lines), and an electrostatic protecting circuit 5a or 5b is arranged between the respective signal lines. At this time, the first electrostatic protecting circuit 5a connected with an odd numbered signal line 3a is arranged toward the driving circuit 1 around the common electrode 4 while the second electrostatic protecting circuit 5b connected with an even numbered signal line 3b is arranged toward the LCD array 2 around the common electrode 4.

The signal lines are curved in portions where the first and second electrostatic protecting circuits 5a and 5b are arranged, so that a space where the electrostatic protecting circuits will be arranged can be obtained. In other words, the odd numbered signal line and the even numbered signal line are curved in their crossing portion to obtain a space where the electrostatic protecting circuits will be arranged.

Figure 5:
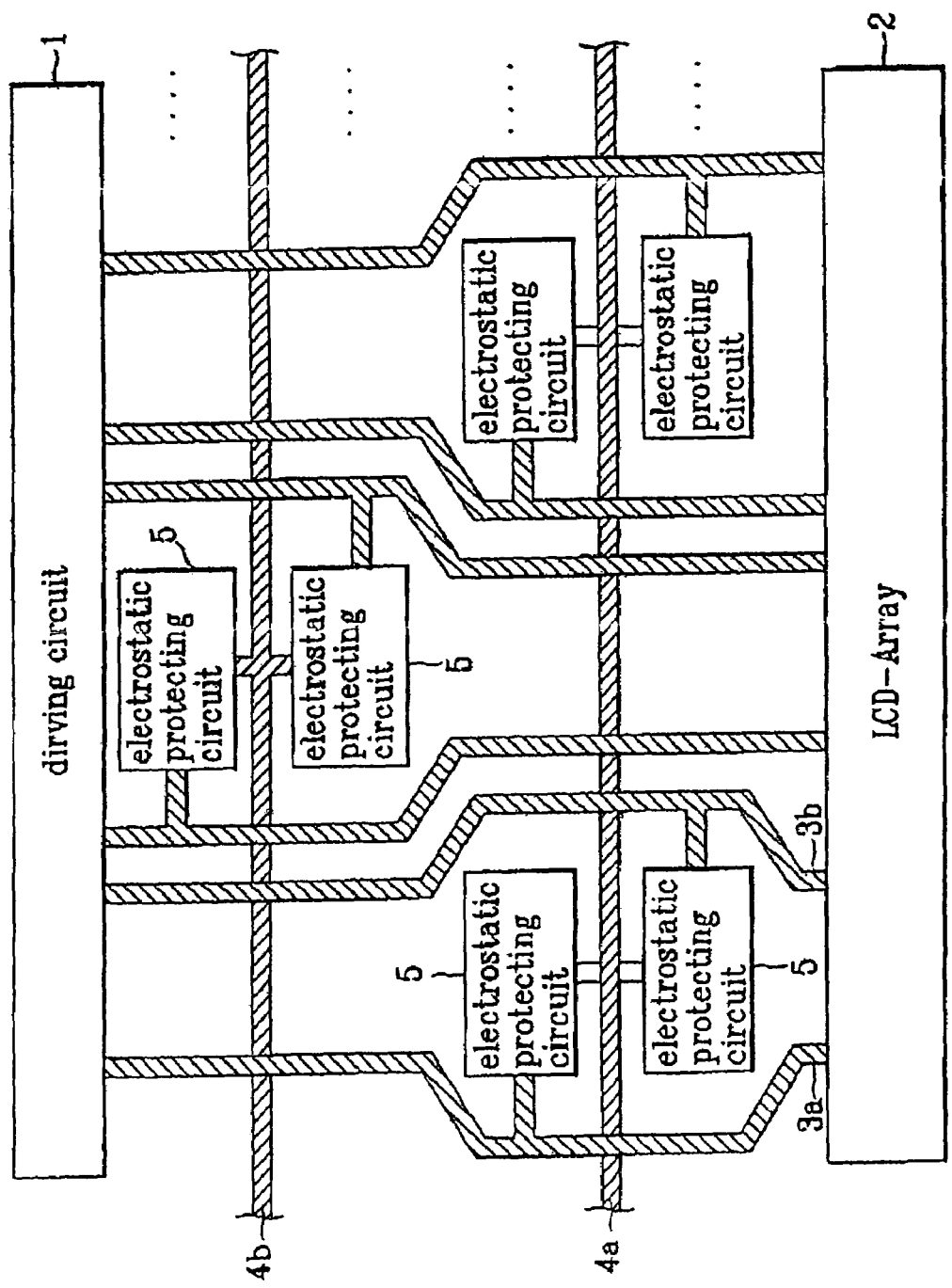
FIG. 5 is a schematic view of an LCD provided with an electrostatic protecting circuit according to the fourth embodiment of the present invention.

FIG. 5 is a schematic view of an LCD provided with an electrostatic protecting circuit according to the fourth embodiment of the present invention.

In the LCD according to the fourth embodiment of the present invention, first and second common electrodes 4a and 4b are arranged between a driving circuit 1 and an LCD array 2 in a vertical direction to a plurality of signal lines 3a and 3b (data lines or gate lines). Adjacent signal lines 3a and 3b are arranged in pairs and an electrostatic protecting circuit 5 is arranged at both sides of the first common electrode 4a between odd numbered signal lines 3a and 3b. The electrostatic protecting circuit 5 is also arranged at both sides of the second common electrode 4b between even numbered signal lines 3a and 3b. At this time, to obtain a space in a portion where the electrostatic protecting circuit 5 is arranged, the signal lines 3a and 3b are curved around the electrostatic protecting circuit 5.

The electrostatic protecting circuit 5 connected with the first common electrode 4a and the electrostatic protecting circuit 5 connected with the second common electrode 4b are not arranged on the same line but arranged to cross each other.

Figure 6:
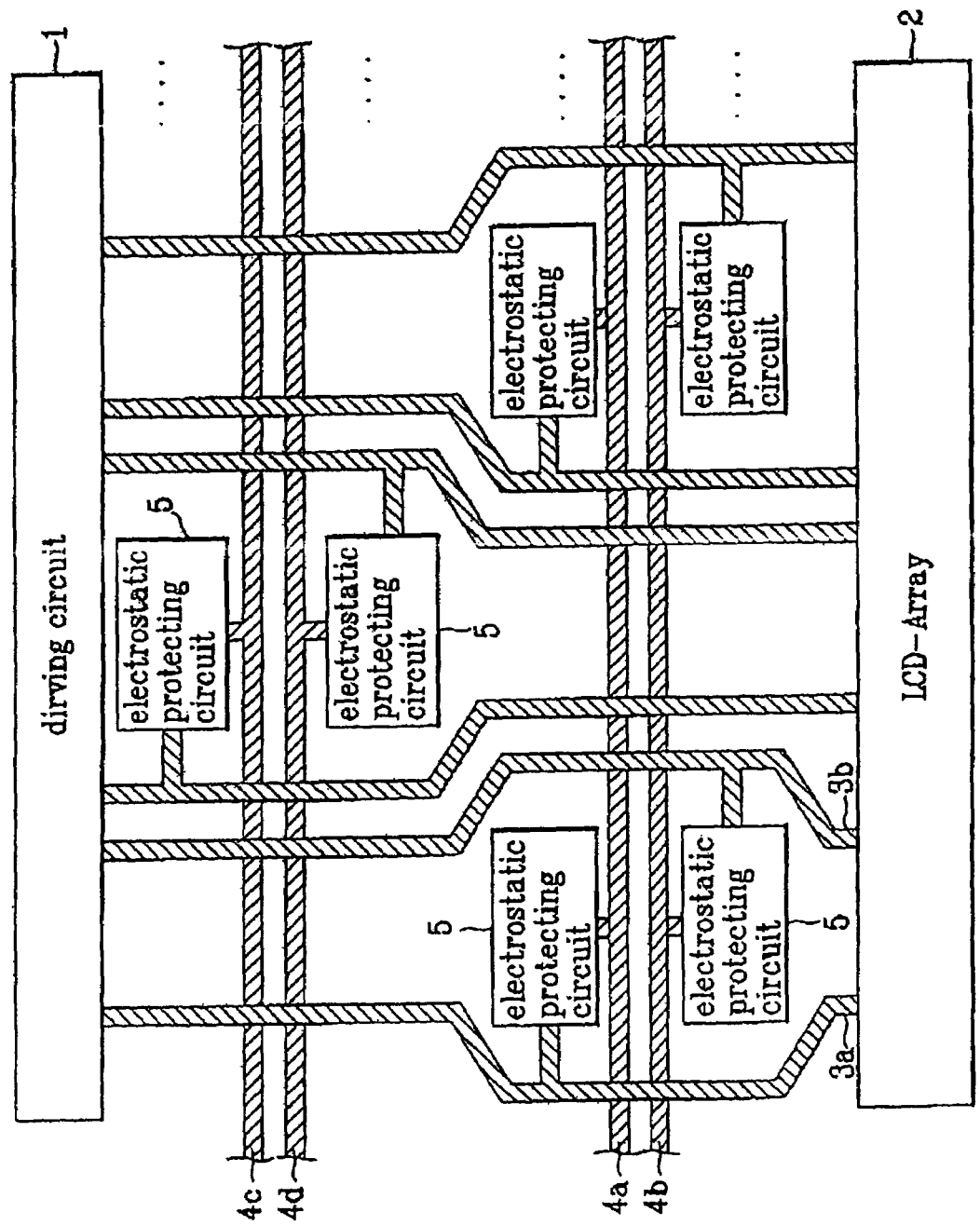
FIG. 6 is a schematic view of an LCD provided with an electrostatic protecting circuit according to the fifth embodiment of the present invention.

FIG. 6 is a schematic view of an LCD provided with an electrostatic protecting circuit according to the fifth embodiment of the present invention.

In the LCD according to the fifth embodiment of the present invention, first, second, third and fourth common electrodes 4a, 4b, 4c and 4d are arranged between a driving circuit 1 and an LCD array 2 in a vertical direction to a plurality of signal lines 3a and 3b (data lines or gate lines). At this time, the first common electrode 4a is adjacent to the second common electrode 4b while the third common electrode 4c is adjacent to the fourth common electrode 4d. The first and second common electrodes are spaced apart from the third and fourth common electrodes.

Adjacent signal lines 3a and 3b are arranged in pairs and an electrostatic protecting circuit 5 is arranged at both sides around :he first and second common electrodes 4a and 4b between odd numbered signal lines 3a and 3b. The electrostatic protecting circuit 5 is also arranged at both sides of the third and fourth common electrodes 4c and 4d between even numbered signal lines 3a and 3b. The signal lines 3a and 3b are curved to obtain a space in a portion where the electrostatic protecting circuit is arranged. That is, the odd numbered signal line and the even numbered signal line are not curved on the same line but curved to cross each other.

As aforementioned, the LCD according to the present invention has the following advantages.

Since the electrostatic protecting circuit is arranged at both sides of the common electrode line, or the signal lines are curved to obtain a sufficient space in a portion where the electrostatic protecting circuit is arranged, a narrow space between the signal lines can effectively be used.

In addition, since the electrostatic protecting circuit is arranged between the narrow signal lines, the LCD of high resolution can be obtained.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An LCD comprising:
   a plurality of pairs of signal lines;
   first and second common electrodes that extend perpendicular to said signal lines;
   a plurality of pairs of first electrostatic protecting circuits, wherein each pair of said first electrostatic protecting circuits is arranged between a corresponding pair of signal lines, wherein the first electrostatic protecting circuits of each pair are arranged on opposite sides of the first common electrode, wherein one of the first electrostatic protecting circuits of each pair connects to one of the signal lines of the corresponding pair of signal lines, and wherein the other first electrostatic protecting circuit of each pair connects to the other signal line of the corresponding pair of signal lines; and
   a plurality of pairs of second electrostatic protecting circuits, wherein each pair of said second electrostatic protecting circuits is arranged between a corresponding pair of signal lines, wherein the second electrostatic protecting circuits of a pair are arranged on opposite sides of the second common electrode, wherein one of the second electrostatic protecting circuits of a pair connects to one of the signal lines of the corresponding pair, and wherein the other second electrostatic protecting circuit of a pair connects to the other signal line of the corresponding pair.

2. The LCD of claim 1, wherein said pairs of first and second electrostatic protecting circuits are alternately arranged.

3. The LCD of claim 1, wherein said signal lines include protrusions.

4. The LCD of claim 3, wherein said protrusions are beveled.

5. The LCD of claim 1, wherein first common electrode includes first and second lines, wherein one of the first electrostatic protecting circuits of a pair connects to said first line, and wherein the other first electrostatic protecting circuit of a pair connects to said second line.

6. The LCD of claim 1, further including driving circuitry and an LCD array, wherein said signal lines extend between said driving circuitry and said LCD array.

* * * * *